Aug. 21, 1945. A. V. REED 2,383,079
FASTENER
Filed April 7, 1944
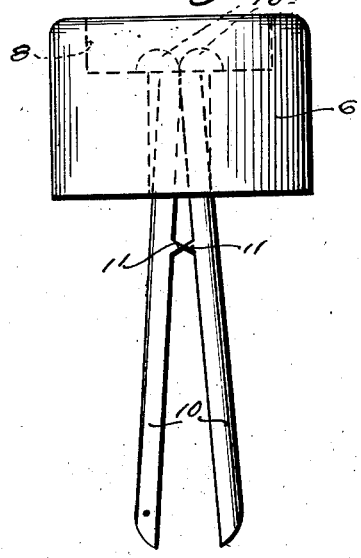
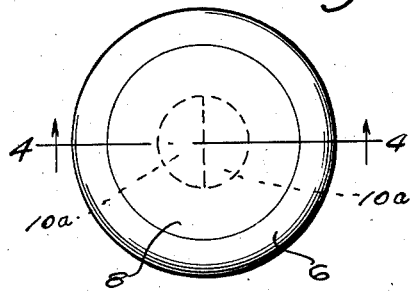
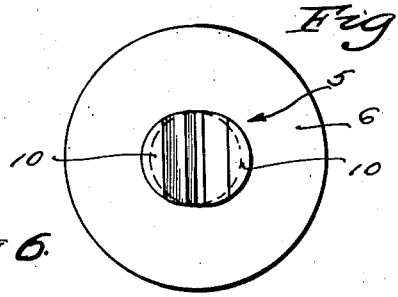
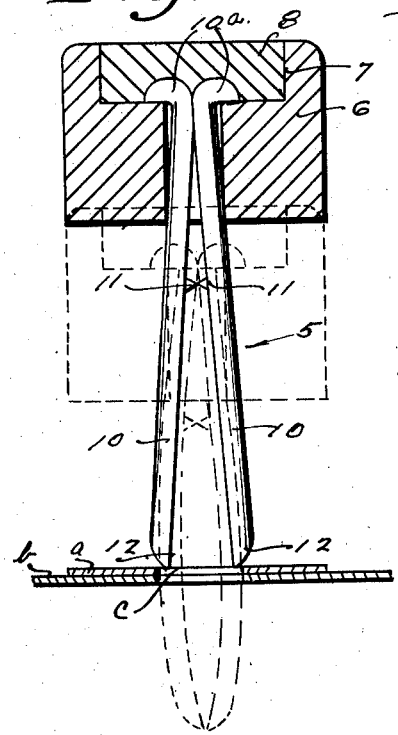
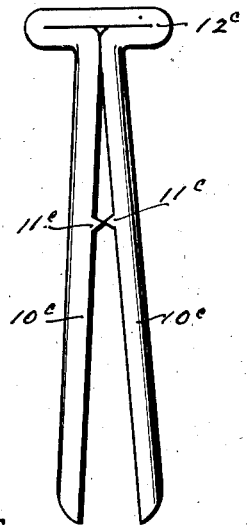
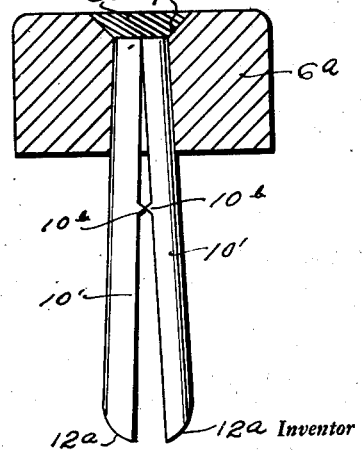
Inventor
Albert V. Reed,
By Clarence A. O'Brien
and Harvey B. Jacobson
Attorneys Patented Aug. 21, 1945

2,383,079

UNITED STATES PATENT OFFICE 2,383,079

FASTENER

Albert V. Reed, Inglewood, Calif.

Application April 7, 1944, Serial No. 530,019

1 Claim. (Cl. 85—5)

This invention relates to new and useful improvements in fasteners for metal sheets and plates for holding the same firmly and definitely together while being drilled, riveted or operated upon in any other manner.

The principal object of the present invention is to provide a temporary fastener for holding plates and other work together which can be easily inserted into the work and subsequently removed conveniently.

Other objects and advantages of the invention will become apparent to the reader of the following description.

In the drawing:

Figure 1 is a side elevational view of the fastener.

Figure 2 is a top plan view.

Figure 3 is a bottom plan view.

Figure 4 is a section on the line 4—4 of Figure 2, and also through a pair of plates to be secured.

Figure 5 is a sectional view through a modified form of fastener.

Figure 6 is a side elevation of another form of leg structure.

Referring to the drawing wherein like numerals designate like parts, it can be seen in Figure 4, that reference characters a, b denote a pair of plates that are to be held together, these plates having been formed with a pair of openings c into which the fastener making up the present invention and generally referred to by numeral 5 is insertable.

The fastener 5 consists of a head 6 having a recess 7 in the top thereof for receiving an insert 8 in which the head portions 10a of a pin structure is anchored, this pin structure consisting of a plurality of spring leg members 10, 10 which are disposed in slight diverged relation as shown in Figure 4 by reason of the provision of a pair of fulcrum points 11, 11 bearing against each other as is clearly shown in Figure 4, and the together disposition of the head portions 10a of said leg members embedded in said insert 8.

The free ends of the legs 10, 10 are rounded off at their outer side portions, as at 12.

With the rounded off ends of the legs 10 set on the work at the openings c, as shown in Figure 4, a blow struck against the head 6 will drive the legs 10 into the work, flexing the legs inwardly beyond the fulcrum point 11 with the result that the portion of the legs driven into the work will be under the force of compression of said flexed legs. Thus the plates will be held firmly against displacement. However, when it is desired to remove the fastener, the free ends of the pins are struck and the fastener will easily displace from the work.

A modification of the invention is shown in Figure 5, reference characters 10′, 10′ denoting a pair of leg members having a pair of their adjacent ends disposed into an opening in a head 6a the inside intermediate portions of the leg members being provided with contacting fulcrum points 10b, 10b. The top side of the head 6a has a pocket 7a and the upper end of the leg members are welded in this pocket 7a as at 8a. The action of the leg members in this form of the invention is the same as in the first form. Further, the free ends of the legs 10′, 10′ are rounded off as at 12a in the same manner and for the same purpose as the form of the invention shown in Figure 4.

In Figure 6 a third embodiment of the invention is disclosed and this consists of a pair of leg members 10c, 10c disposed in diverged relation and being of some suitable spring material. These leg members emanate from a head structure 12c. In the construction of this modification, it will be seen that the legs 10c, 10c and the head 12c are constructed of a single piece of spring material, the intermediate portion being formed to provide a T-formation which can be easily anchored or embedded in an insert or other mass as in the manner of the form of the invention shown in Figure 4. The embodiment shown in Figure 6 includes fulcrum points 11c, 11c for holding the legs in diverged position as shown.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A fastener of the character described comprising a head structure, a pair of diverged leg members of spring material, said leg members being provided with portions embedded in the head structure, the intermediate inside portions of the leg members being provided with oppositely projecting contacting fulcrum points for maintaining the legs in diverged relation, the free ends of said leg members being rounded.

ALBERT V. REED.